Figure 1:
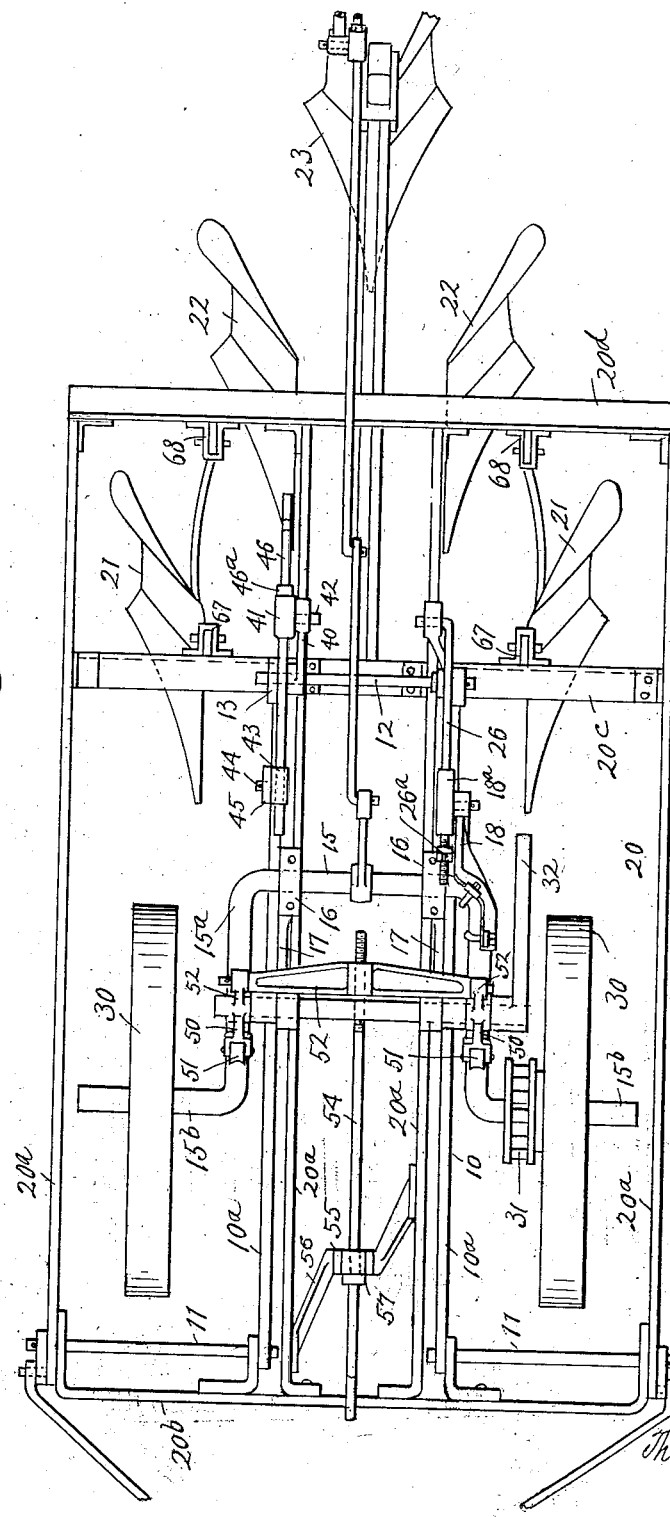

B. A. RUPPRECHT.
RIDGED LAND CULTIVATOR.
APPLICATION FILED DEC. 19, 1919.

1,361,906.

Patented Dec. 14, 1920.
2 SHEETS—SHEET 1.

Inventor
Bert A Rupprecht
By
Thurston Kwis & Hudson
attys.

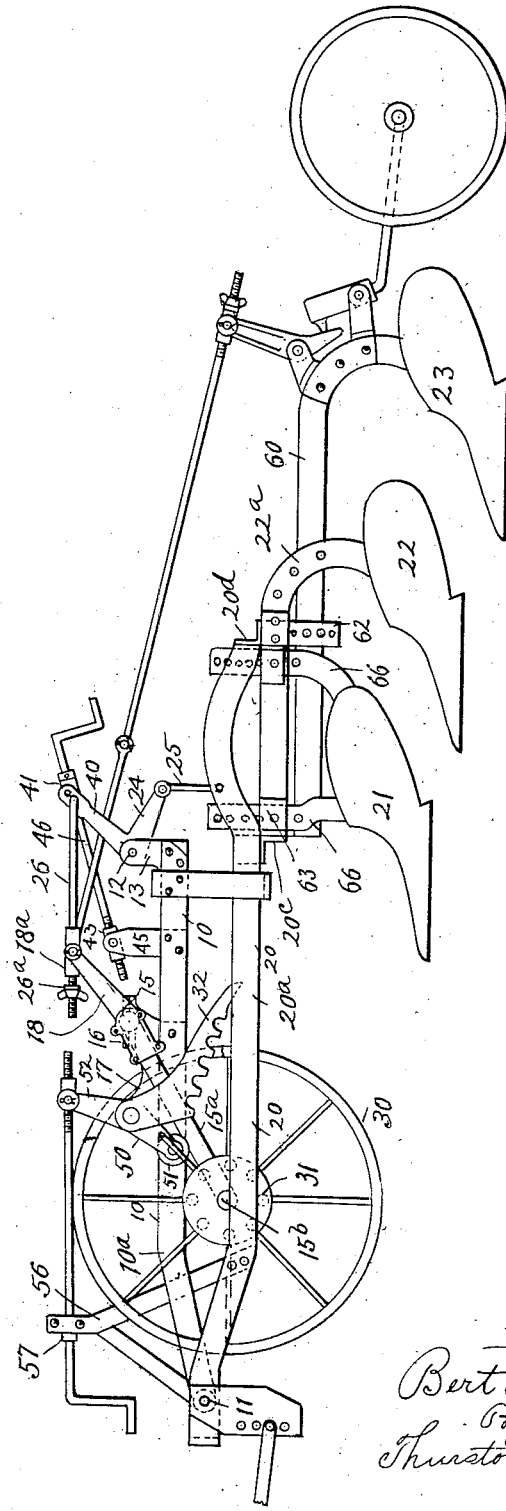

UNITED STATES PATENT OFFICE.

BERT A. RUPPRECHT, OF NEW ORLEANS, LOUISIANA, ASSIGNOR TO THE CLEVELAND TRACTOR COMPANY, OF EUCLID, OHIO, A CORPORATION OF OHIO.

RIDGED-LAND CULTIVATOR.

1,361,906.     Specification of Letters Patent.     Patented Dec. 14, 1920.

Application filed December 19, 1919. Serial No. 346,044.

*To all whom it may concern:*

Be it known that I, BERT A. RUPPRECHT, a subject of the King of England, residing at New Orleans, in the parish of Orleans and State of Louisiana, have invented a certain new and useful Improvement in Ridged-Land Cultivators, of which the following is a full, clear, and exact description.

This invention is a land cultivating implement which is especially adapted for use on cane plantations, although it is useful for the cultivation of any land on which the crops are grown in ridges. In the cultivation of this land the ridges are built up from time to time as the crop is growing, and are torn down after the crop has been harvested; that is to say, as the plants are growing, the earth between the rows is, from time to time, thrown toward the rows to build up the ridges; and this must be done several times during the season. And after the crop is harvested the ridges are torn down and the earth of which they were composed is thrown into the space between the rows so that this land as it lies between seasons is sometimes in the form of a ridge which is highest about midway between the rows. As the ridges are built up, the earth is taken from between the rows and is thrown toward the rows. The result is that each time the earth is shifted, whether for building up or tearing down the ridges, a great change is made in the contour of the land between the rows on which the implement wheels must run, and in which the plows must operate.

In some parts of the season, the surfaces on which the wheels must ride are above the surface of the land in which the plows must operate; while in other parts of the season the surfaces on which the wheels must run are much above the surface of the land in which the plows must operate. In fact, toward the end of a season, the land between the rows takes the form of a deep ditch with slanting sides. It would perhaps not be difficult to merely provide means to adjust the tillage tools up and down on the frame of an ordinary gang plow so that said gang plow could work successfully under the various practical conditions stated on a cane plantation if the plows do not have to go onto and off the headlands at the ends of the rows. These headlands, however, are usually narrow, and on large plantations there are tracks on these headlands for cars to run on. When the plow passes onto the headlands the plow bottoms must be lifted high enough to clear the headlands, and any obstructions, such as tracks thereon. If the plow bottoms are adjusted for throwing toward the rows the land which constitutes the slanting sides of a deep ditch between the rows, it is necessary to provide the plow with means for lifting the plow bottoms approximately three feet as the plow goes onto the headlands. Attempts to endow a gang plow with the capacity to lift the plow bottoms the required distance have heretofore been practical failures for various reasons, but principally because the plow structure became top heavy and easily tipped over.

The aim of the present invention is to provide a gang plow which can be successfully used on cane plantations for the purposes stated under all the various conditions which exist from time to time. More particularly, the object of the invention is to provide a plow with means whereby the plow bottoms or other tillage tools may be easily raised high enough to clear the headlands and the obstructions thereon without making the plow structure top heavy, regardless of what may be the working positions of the tillage tools.

The invention consists in the construction and combination of parts shown in the drawings and hereinafter described and pointed out definitely in the appended claims.

In the drawings, Figure 1 is a plan view and Fig. 2 is a side elevation of a gang plow in which the present invention is embodied.

The plow structure includes two frames which are pivoted together at their front ends on a horizontal transverse axis. To distinguish these frames one of them will be called the axle frame 10, while the other will be called the plow frame 20.

The plow frame 20 is a rigid rectangular structure which, as shown, comprises four parallel longitudinal beams 20ª, a front transverse beam 20ᵇ, and two transverse members 20ᶜ, 20ᵈ, each of which as shown is made of angle iron. The plow bottoms (or other tillage tools) 21, 22, 23, are connected with the rear end of the plow frame.

The axle frame as shown comprises two longitudinally extended frame bars 10ª 11

(which at their front ends are pivoted to the plow frame by means of the transversely extended rods 11) and means to hold these frame bars in unchanging relations. As shown, the rear ends of these two beams 10ᵃ are held in spaced unchanging relation by a transverse rock shaft 12 which is mounted in bearings carried by brackets 13 which are fixed to the rear ends of said frame members 10ᵃ.

A bent axle 15 of the usual form is rotatably mounted in boxes 16 carried by bracket plates 17 which are fixed to the two frame members 10ᵃ. This bent axle has two forwardly extended arms 15ᵃ which carry at their front ends laterally extended spindles 15ᵇ on which the wheels 30 are rotatably mounted. These wheels may be adjusted laterally upon these axle spindles so as to vary the width of their tread. It is to be noted, however, that outside of the wheels, and on both sides of the implement, are two frame members 20ᵃ which serve the useful purpose of preventing the growing drooping cane plants from becoming entangled in the spokes of these wheels.

It is common in plow structures of this general nature to provide means by which to turn the axle in its bearings with the result that since the wheels will always engage the ground the frame on which the axle is mounted will be lifted or lowered with respect to the ground.

There are a great variety of means available for imparting the said turning movement to such an axle. The drawing shows one means which is in common use for that purpose; but since it is so well known it is not necessary to describe it in detail. It will be perhaps sufficient to say that secured to one of the wheels is a device in the nature of a gear 31. A rack bar 32 is pivoted to the same bracket 17 before referred to, which is fixed to the axle frame. Normally, this rack bar is out of engagement with the gear. If, however, it be swung forward on its pivot, its forward end will come into engagement with the gear and thereafter as the gear turns it will, by engaging successive teeth on this rack bar cause the axle to turn in its boxes with the result of lifting the axle frame.

It is to be understood, however, that this particular means for raising and lowering the frame is not of my invention, and is not essential to an embodiment of the invention.

A bell crank lever 24 is secured to the rock shaft 12 which as stated is mounted in the axle frame at the rear end thereof. The rearwardly extended arm of this bell crank is connected by the link 25 with the plow frame near its rear end. The upwardly extended arm of this bell crank is connected by a link 26 with an arm 18 which is rigidly fixed to the axle. Specifically, this arm 18 is clamped to one of the forwardly extended arms 15ᵃ of the axle.

When the axle is turned in its bearings, as it must to lift the axle frame above the ground, this very turning movement, transmitted through the arm 18 and link 26 will so rock the bell crank lever 24 as will cause the rear end of the plow frame to be lifted relatively to the axle frame on which the bell crank lever is supported. Because the plow frame is connected with the axle frame by the bell crank lever 24 and link 25, said plow frame would be raised as much as the axle frame is raised even if the bell crank 24 did not rock upon its pivot; but by the rocking of the bell crank 24 the rear end of the plow frame is lifted an additional distance above the ground. The descent of the axle frame causes the turning of the axle in its boxes in the reverse direction, and this will allow the plow frame to go down not only as far as the axle frame goes, but such additional distance as results from the rocking of the bell crank 24. The downward movement of the plow frame relative to the axle frame may, however, be limited, as for example, by the means shown, as follows: An arm 40 fixed to the rock shaft 12. A longitudinally extended sleeve 41 is swiveled by means of a transversely extended shaft 42 to the upper end of the arm 40. A sleeve nut 43 is pivoted by means of a horizontal shaft 44 to a bracket 45 fixed to one of the axle frame bars 10ᵃ; and a long screw rod 46 passes through the sleeve 41 and screws into the nut 43, said rod having on it a collar 46ᵃ with which the sleeve 41 will engage as the plow frame is swinging downward relative to the axle frame. By turning this rod 46 in nut 43 the position of the collar 46ᵃ relative to sleeve 41 will be varied, and thereby the position of the plow frame with respect to the axle frame when in the working position may be controlled as desired. So again may control be exercised over the distance which the plow frame will be raised relative to the axle frame. To effect this result the rod 26 is made to slide loosely through a sleeve 18ᵃ which is swiveled on a horizontal axis to the end of the arm 18. On this rod 26 is an adjustable nut 26ᵃ. By adjusting the position of this nut one may vary the extent to which a given arcual movement of the arm 18 will lift the plow frame relative to the axle frame.

The extent to which the axle frame may be lowered relative to the ground may also be regulated. To effect this result two levers 50 are pivoted on alined pivots to the bracket 17. Each of these carries at its lower end a roller 51 placed so as to respectively engage the side members 15ᵃ of the axle. The upper ends of these two levers 50 are connected by a yoke 52 having a threaded opening through its center. A long screw 54 screws through this opening and passes loosely through a hole 55 on the cross bar 56 which extends between and is connected with two of the plow frame members 20ª. On this screw in front of this bar 56 is a shoulder 57 which may engage the bar and thereby limit the rocking of both levers 50 on their axes. When, therefore, the outer ends of the axle are swinging upward as they do when the axle frame is being lowered, the side members 15ª of the axle engage these two wheels 51 and thereby such swinging movement is stopped. This stopping point may be varied by screwing the screw 54 in or out of the yoke, to vary the position of collar 57 with respect to the cross bars 56 when the axle frame is raised.

Tillage tools, as for example, plow bottoms, are secured to the rear end of the plow frame by means which permit some of said tools to be adjusted up or down with respect to the plow frame. The tillage tools shown are plow bottoms 21, 22, 23. The middle plow 23 is what is sometimes known as a buster. It carries two plowshares faced in opposite directions. This middle buster is fixed to the rear end of a plow beam 60 which is adjustably connected to downwardly extended bars 62, 63, which are respectively secured to the two cross beams 20ᶜ, 20ᵈ, of the plow frame. The two outside front plow bottoms are also vertically adjustable with respect to the plow frame. To each of these outside plow bottoms two vertical bars 66 are secured; and these bars may be moved up and down in brackets 67 carried by the transverse beam 20ᶜ and other brackets 68 carried by the transverse beam 20ᵈ, and they may be locked in any desired position by pins going through holes in the two bars 66 and through holes in these brackets. The two intermediate plow bottoms 22 are secured to beams 22ª which need not have any vertical adjustability.

In using the described structure in cane plantations for building up the ridges, the plow will be drawn between the rows. At the beginning of the season, or when the first step is made toward building up the ridges, the ground midway between the two ridges will be higher than or as high as the ground on each side thereof on which the wheels must roll. Therefore, for this particular work the rear middle buster will be raised and the two front plowshares 21 will be lowered with respect to the middle plowshares 22. On the next trip of the plow between the ridges for the purpose of building them up, the ground midway between the ridges will be lower and the part on which the wheels roll may be higher than before; therefore the rear middle buster will be lowered and the two front plowshares raised relative to the plowshares 22. The adjustment of these plowshares will enable the plow to continue its work of building up the ridges from the ground between the ridges to any extent and height desired.

When it is desired to tear down the ridges the middle buster is taken off and the other plow bottoms transposed from one side to the other of the plow frame, because the plow is driven straddling the ridges. The front plow bottoms are adjusted up and down as may be required for the successive tearing down of the ridges, and the throwing of the earth into the space between them.

As the plow, when either building up or tearing down ridges, passes onto the headlands, the axle frame will be lifted by whatever means are provided for turning the axle in its bearings; and as the axle is so turned, it will so operate the described mechanism that the rear end of the plow frame will be additionally lifted to such an extent that the plows will certainly clear the headland and the tracks or other obstructions thereon.

Having described my invention, I claim:—

1. In a land cultivating implement, the combination with an axle frame, a bent axle rotatively mounted thereon, wheels mounted on said bent axle, and means for turning said axle in its bearings to raise the axle frame, with a plow frame which is pivoted to the axle frame, means mounted on the axle frame for lifting the plow frame relatively to the axle frame, and means connected with the axle through which the turning of the axle in its bearings operates the plow frame lifting means.

2. In a land cultivating implement, the combination with an axle frame, a bent axle rotatively mounted thereon, wheels mounted on said bent axle, and means for turning said axle in its bearings to raise the axle frame, with a plow frame which is pivoted to the axle frame, a bell crank lever pivoted to the axle frame, an arm secured to the axle and projecting upward therefrom and connected with an arm of said bell crank lever, and connections between the other arm of said bell crank lever and the plow frame.

3. In a land cultivating implement, the combination with an axle frame, a bent axle rotatively mounted thereon, wheels mounted on said bent axle, and means for turning said axle in its bearings to raise the axle frame, with a plow frame which is pivoted to the axle frame, means mounted on the axle frame for lifting the plow frame relatively to the axle frame, tillage tools, and means adjustably securing said tools to the rear end of the plow frame.

4. In a land cultivating implement, the combination with an axle frame, a bent axle rotatively mounted thereon, wheels mounted on said bent axle, and means for turning said axle in its bearings to raise the axle frame, with a plow frame which is pivoted to the axle frame, means mounted on the axle frame for lifting the plow frame relatively to the axle frame, a double acting plow secured centrally to the rear end of the plow frame, means for adjusting said plow up and down with respect to the plow frame, and two oppositely acting plow bottoms secured to the plow frame on opposite sides of the middle thereof, and means to adjust said two plow bottoms vertically up and down with respect to said plow frame.

5. In a land cultivating implement, the combination with an axle frame, a bent axle rotatably mounted thereon, wheels mounted on said bent axle, and means for turning said axle in its bearings to raise the axle frame, with a plow frame which is pivoted to the axle frame and has longitudinally extended side beams which lie outside of the two wheels respectively, and means mounted on the axle frame for lifting the plow frame relatively to the axle frame.

In testimony whereof, I hereunto affix my signature.

BERT A. RUPPRECHT.